June 2, 1970     J. L. SCHNEIDER     3,515,322

CARRIER FOR MOTORCYCLES

Filed Aug. 19, 1968

INVENTOR.

John L. Schneider

United States Patent Office 3,515,322
Patented June 2, 1970

---

3,515,322
CARRIER FOR MOTORCYCLES
John L. Schneider, 110 W. Jefferson Road,
Cheyenne, Wyo. 82001
Filed Aug. 19, 1968, Ser. No. 753,498
Int. Cl. B62j 9/00
U.S. Cl. 224—32　　　　　　　　　　　　　　4 Claims

ABSTRACT OF THE DISCLOSURE

A device for placement over the rear fender of a motorcycle in which may be stored or carried various items which will be protected from the weather. This device is constructed so as to have a recess in which the fender may be received and a rib-like structure supports the duck canvas which covers the device and prevents rain from wetting the contents within the carrier and the device has a light which may be turned on in order to view inside the carrier when opening the zipper at the rear of the device.

---

This invention relates to motorcycle accessories, and more particularly to a carrier for the rear fender of motorcycles.

It is therefore the main purpose of this invention to provide a carrier for motorcycles which will have a base which is concaved in order that it may be received over the rear fender of a motorcycle and the carrier allows for the storing of various items and will prevent them from getting wet when it rains.

Another object of this invention is to provide a carrier for motorcycles which will have tab means secured to the base in order to protect the covers of the saddle bags on the rear fender of the motorcycle and the carrier allows for the storing of various items and will prevent them from getting wet when it rains.

Still another object of this invention is to provide a carrier for motorcycles which will have ribs spaced apart on the upper side of the base, said ribs supporting the duck canvas attached to said carrier, the duck canvas preventing rain from wetting the contents of said carrier and a turn buckle and hook combination at the forward end of said carrier is received through an opening in the rear fender in order to hold the carrier to the rear fender of the motorcycle.

Other objects of the present invention are to provide a carrier for motorcycles which is simple in design, inexpensive to manufacture, rugged in construction, easy to use and efficient in operation. These and other objects will become readily apparent upon a study of the following specification and the accompanying drawing wherein.

Figure 1:
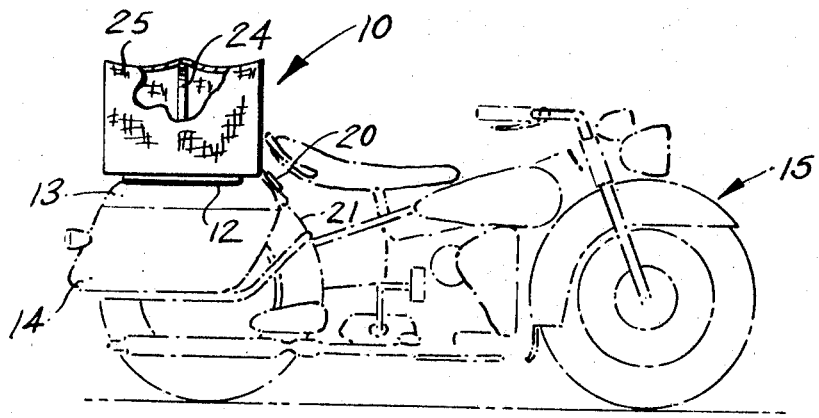
FIG. 1 is a side view of the present invention shown partly broken away and secured to a motorcycle which is shown in phantom lines.
Figure 2:
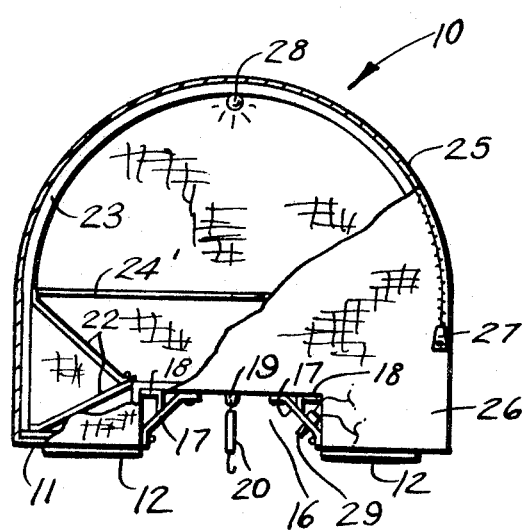
FIG. 2 is an enlarged fragmentary rear view of the carrier shown removed from FIG. 1.
Figure 3:
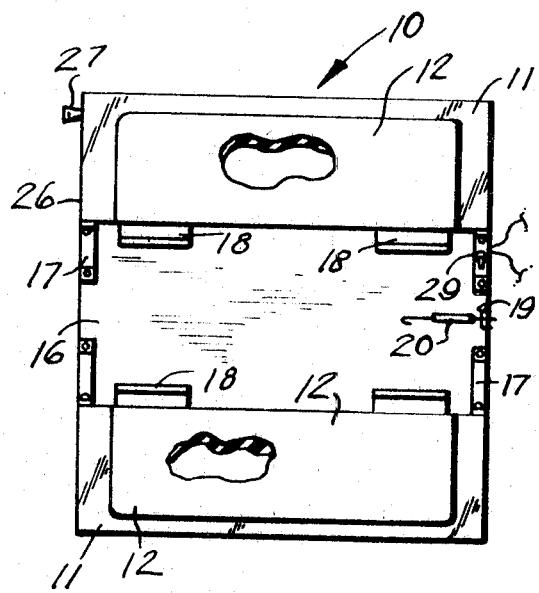
FIG. 3 is a bottom plan view of FIG. 1 showing the fender pads partly broken away.

According to this invention, a carrier 10 for motorcycles is provided with a base 11 to which is adhered a pair of pads 12 in order to protect the covers 13 of saddle bags 14 on motorcycle 15. Base 11 has a recess 16 for the purpose which hereinafter will be described. A plurality of angular braces 17 are secured to base 11 to provide rigidity thereto and a plurality of angle irons 18 are secured within recess 16 also to provide for correct positioning of carrier 10 on motorcycle 15. A lug 19 at the forward end of recess 16 provides securement means for a hooked turnbuckle 20, the turnbuckle 20 providing a means of holding carrier 10 to motorcycle 15 and also engaging (not shown) an opening in the fender 21 of motorcycle 15. A plurality of braces 22 are secured to base 11 on the interior of carrier 10 and secured also to the inside of arcuate ribs 23. A center rib 24 is placed centrally between ribs 23 and the combination of ribs 23 and 24 provides support for the duck covering 25 which protects the contents of carrier 10 from the elements. A crossbar 24' is secured to the forward rib 23 of carrier 10 and provides further stiffening and rigidity for carrier 10. The rear duck covering face 26 of carrier 10 is provided with a zipper 27 which allows for access to the interior of carrier 10 as desired, and a bulb 28 on the interior of carrier 10 allows for the illumination for the interior when the switch 29 is turned to "on" position, the switch 29 being in series connection with the electrical circuit of motorcycle 15.

In use, carrier 10 is placed so that the rear fender 21 of motorcycle 15 rests within recess 16 of base 11 of carrier 10. The turnbuckle and hook 20 is then engaged with an opening in fender 21. The zipper 27 is open and various items may be placed on the interior of carrier 10, after which zipper 27 is closed and the entire upper and face areas of carrier 10 are covered with covering 25 which prevents rain and snow from effecting the contents of carrier 10.

What I now claim is:

1. A carrier for motorcycles comprising a recessed base member, a plurality of braces carried by said base member providing rigidity to said base member, a plurality of spaced apart and arcuately configurated ribs carried by said base member providing securement means for a duck covering, a plurality of internal braces providing rigidity for said carrier and a bulb and switch providing illumination means for the interior of said carrier, a turn buckle and hook member providing a means of securing said carrier to the rear fender of said motorcycle.

2. The combination according to claim 1, wherein said duck covering is supported by said ribs which are spaced apart and secured at their lower extremities to said base of said carrier, said duck covering covers the face of the rear of said carrier and the face of the forward end of said carrier to prevent precipitation from getting to the contents of said carrier and crossbar means on the interior of said carrier provides stiffening for the forward end of said carrier and in conjunction with said angular braces secured to the base of said front and rear ribs of said carrier, and said rear face of said carrier is provided with a zipper for closing said face after placing materials into the interior of said carrier.

3. The combination according to claim 2, wherein a pair of rectangular rubber pads are adhered to the bottom of the base of said carrier, said rubber pads being in engagement with the covers of the saddle bags carried by said motorcycle and said pads prevent damage to covers of said saddle bags of said motorcycle.

4. The combination according to claim 3, wherein L-shaped angle irons secured within said recesses of said base and said L-shaped angle irons provides for alignment of said base to said rear fender of said motorcycle and a switch secured to one of said angular braces within said recess of said base provides switch means for a light on the interior of said carrier, and said light and switch are in series with the electrical circuit of said motorcycle.

References Cited

UNITED STATES PATENTS

| | | | |
|---|---|---|---|
| 1,633,497 | 6/1927 | Schoelerman | 224—42.11 |
| 3,396,885 | 8/1968 | Giondi | 224—32 |

FOREIGN PATENTS 950,350　10/1956　Germany.

GERALD M. FORLENZA, Primary Examiner